No. 786,293.

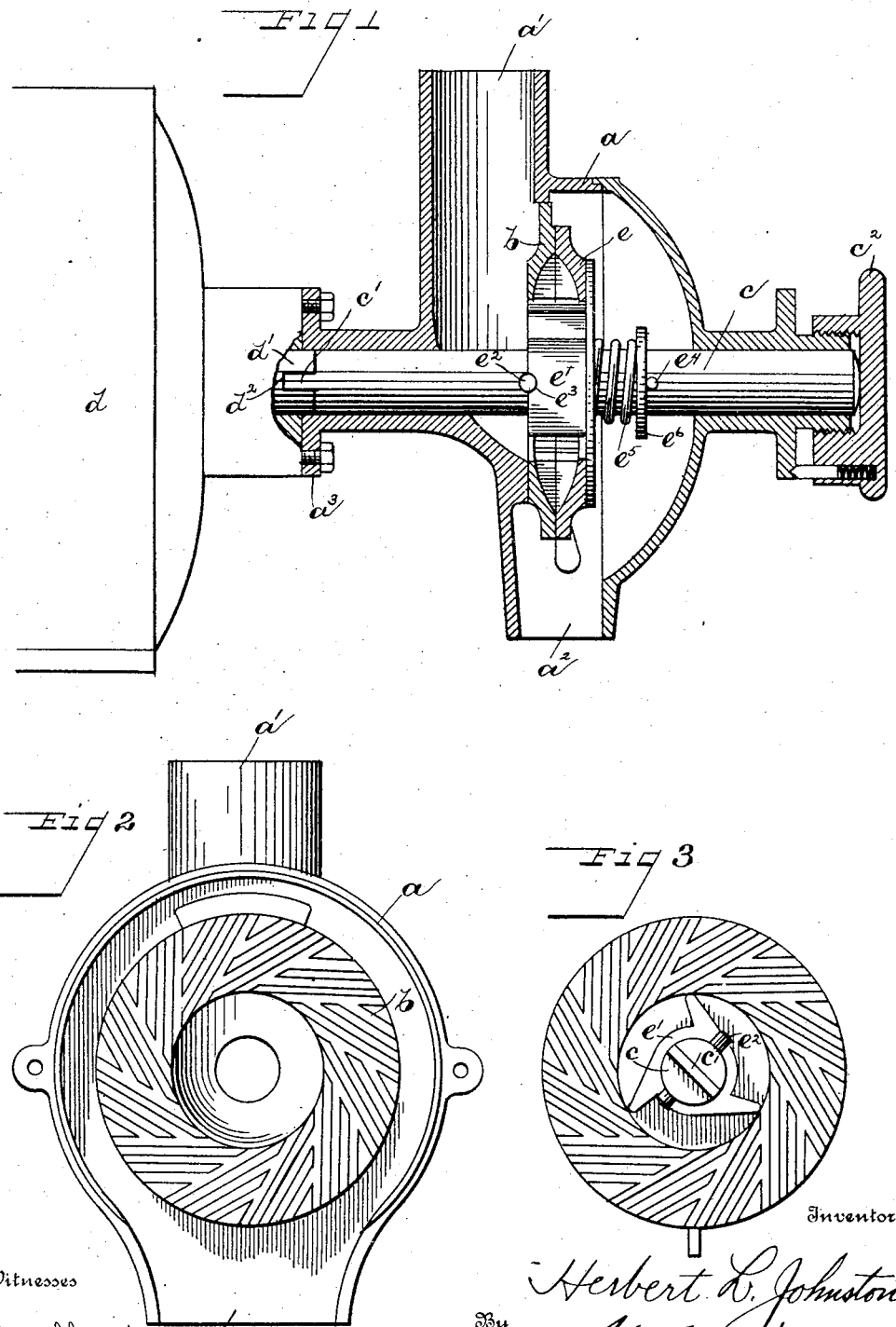

Patented April 4, 1905.

UNITED STATES PATENT OFFICE.

HERBERT L. JOHNSTON, OF TROY, OHIO, ASSIGNOR TO THE HOBART ELECTRIC MANUFACTURING COMPANY, OF TROY, OHIO, A CORPORATION OF OHIO.

GRINDING-MILL.

SPECIFICATION forming part of Letters Patent No. 786,293, dated April 4, 1905.

Application filed September 19, 1904. Serial No. 224,995.

*To all whom it may concern:*

Be it known that I, HERBERT L. JOHNSTON, a citizen of the United States, residing at Troy, in the county of Miami and State of Ohio, have invented certain new and useful Improvements in Grinding-Mills, of which the following is a specification.

My invention relates to improvements in grinding-mills, and it particularly relates to that class of mills used for grinding coffee, although the improvements may be applicable to other forms of grinding-mills.

The object of my invention is to provide improved means for readily and automatically permitting the disengagement of the movable grinding-surface of the mill from its driving connection in case of the entrance into the mill of any foreign substance which would endanger the same.

A further object of my invention is to provide a driving connection for the device with the source of power which can be readily and easily made and one which will permit the ready adjustment of the parts.

A further object is to improve and simplify the construction of devices of this character.

My invention consists in the constructions and combinations of parts hereinafter described, and pointed out in the claims.

In the accompanying drawings, Figure 1 is a vertical sectional view of a device embodying my invention. Fig. 2 is an end view of the stationary grinding-bur and the portion of the casing to which it is attached, the view being taken looking to the left of Fig. 1. Fig. 3 is an end view, looking in the opposite direction, of the movable grinding-bur and its driving-shaft.

Like parts are represented by similar letters of reference in the several views.

In the said drawings, $a$ represents the outer casing, which is formed in two parts in the usual manner and is provided with the usual feed-inlet $a'$ and delivery-orifice $a^2$. Secured in the casing in any suitable manner is a stationary grinding-bur $b$. Mounted in suitable bearings in the casing is a driving-shaft $c$, adapted to be driven, preferably, by an electric motor $d$, the casing $a$ being bolted to the bearing for the armature-shaft $d'$ of said motor by means of a collar $a^3$, formed on one of the bearings for the shaft $c$ in such a manner as to bring the shafts $c$ and $d'$ in alinement with and adjacent to each other.

The shaft $c$ is adapted to be adjusted longitudinally by means of the adjusting-nut $c^2$, screw-threaded on the outer bearing for said shaft, for the purpose of varying the relation of the grinding-surfaces. In order to permit of this adjustment and also in order to provide means for easily and quickly connecting the two shafts $c$ and $d'$, I have formed on the end of one of said shafts (shown as the one $c$) a tongue $c'$ and on the other shaft, $d'$, a slot or groove $d^2$, said tongue being adapted to engage in said slot, and thus form a driving connection between the two shafts. This connection not only permits the shafts to be quickly and easily connected up and detached, but also allows the longitudinal adjustment of one shaft with reference to the other to a limited distance without destroying the driving connection.

In grinding-mills it sometimes happens that hard foreign substances are fed into the same with the material to be ground, the entrance of anything of this nature endangering the grinding-surfaces, as well as other parts of the mill. To obviate any danger from this source, I have provided improved means for throwing the movable grinding member out of driving engagement in case of the entrance between the grinding-surfaces of any such hard foreign substance. $e$ represents the movable grinding-bur, the hub $e'$ of which is mounted loosely upon the driving-shaft $c$. Extending through the shaft is a pin $e^2$, the protruding ends of which are adapted to engage in recesses $e^3$ in the inner end of the hub of said bur. Also extended through the shaft on the opposite side of said bur is a pin $e^4$, and about the shaft, between the said pin $e^4$ and the adjacent end of the hub $e'$, is placed a coiled spring $e^5$, a washer $e^6$, however, being preferably interposed between the pin and spring.

In the operation of the device the spring not only serves to hold the grinding-surfaces in yielding grinding relation, but also normally holds the movable grinding-bur in driving connection with the shaft through the medium of the pin $e^2$ and the recesses $e^3$. In the event of a hard substance entering between the grinding-surfaces the bur $e$ will give against the tension of the spring until the inner end of its hub clears the pin $e^2$, thus breaking the driving connection with the shaft. As soon as the foreign substance is removed the spring will throw the bur back into position to become reëngaged with the shaft, as will be readily understood.

Having thus described my invention, I claim—

1. In a grinding-mill, a stationary grinding member, a driving-shaft, a movable grinding member loosely and slidably mounted on said driving-shaft, a projection on said shaft adapted to engage with said movable grinding member to form a driving connection between same and said shaft, a spring on said shaft adapted to hold said movable grinding member in engagement with said projection but adapted to yield to permit said connection to be broken, and means for adjusting said shaft to vary the relation of said grinding members, substantially as specified.

2. In a grinding-mill, stationary and movable grinding members, said movable grinding member being mounted loosely upon a driving-shaft, a pin in said shaft adapted to engage with recesses in said movable grinding member to form a driving connection, and a spring on the opposite side of said movable grinding member to hold the same in engagement with said pin but adapted to yield under tension to permit the disengagement of said member with said pin, substantially as specified.

3. In a grinding-mill, stationary and movable grinding members, a driving-shaft upon which said movable member is loosely mounted, means on said shaft for normally holding said movable member in driving connection therewith including a coiled spring about said shaft which also serves to hold said grinding members in yielding grinding relation, said spring being adapted to yield sufficiently to permit the driving connection to be broken, substantially as specified.

4. In a grinding-mill, stationary and movable grinding members, a driving-shaft for said movable member, a spring on said shaft to normally hold said movable member in driving connection with said shaft and also to hold said grinding members in yielding grinding relation, a motor-shaft detachably connected to said driving-shaft, and means for adjusting said driving-shaft to vary the relation of said grinding members, said adjustment being adapted to be made without disturbing the driving relation of the respective parts, substantially as specified.

In testimony whereof I have hereunto set my hand this 10th day of September, A. D. 1904.

HERBERT L. JOHNSTON.

Witnesses:
   F. E. LEWIS,
   O. D. STEEL.